United States Patent [19]

Ewbank et al.

[11] Patent Number: 4,648,092
[45] Date of Patent: Mar. 3, 1987

[54] PHASE COUPLING MULTIPLE LASERS

[75] Inventors: Mark D. Ewbank, Newbury Park; Jack Feinberg, Manhattan Beach; Mohsen Khoshnevisan, Newbury Park; Pochi A. Yeh, Thousand Oaks, all of Calif.

[73] Assignee: Rockwell International Corporation, El Segundo, Calif.

[21] Appl. No.: 780,057

[22] Filed: Sep. 25, 1985

[51] Int. Cl.$^4$ ............................................. H01S 3/098
[52] U.S. Cl. ........................................ 372/18; 372/21; 372/97; 372/98
[58] Field of Search .................... 372/21, 19, 98, 18, 372/32, 97

[56] References Cited

U.S. PATENT DOCUMENTS

| 4,096,448 | 6/1978 | Hayes ................................. 372/18 |
| 4,233,571 | 11/1980 | Wang et al. . |
| 4,390,991 | 6/1983 | Pearson ............................... 372/21 |
| 4,493,085 | 1/1985 | Valley . |
| 4,493,086 | 1/1985 | Jain et al. . |

OTHER PUBLICATIONS

Chow; "Phase Locking of Lasers by an Injected Signal"; Opt. Lett., vol. 7, No. 9, Sep. 1982.
Abrams et al., Degenerate Four-Wave Mixing in Absorbing Media, Optics Letters, vol. 2, p. 94 (1978).
Cronin-Golomb et al., Laser with Dynamic Holographic Intracavity Distortion Correction Capability, Applied Physics Letters, vol. 41, p. 219 (1982).
Feinberg, Continuous-Wave Self-Pumped Phase Conjugator with Wide Field of View, Optics Letters, vol. 8, p. 480 (1983).
Fisher et al., On-Resonant Phase-Conjugate Reflection and Amplification at 10.6 $\mu$m in Inverted $CO_2$, Optics Letters, vol. 4, p. 140 (1979).
Giuliano, Applications of Optical Phase Conjugation, Physics Today, p. 27 (Apr. 1981).
Lind et al., Phase Conjugation by Resonantly Enhanced Degenerate Four-Wave Mixing, Optical Engineering, vol. 21, p. 190 (1982).
Pepper, Nonlinear Optical Phase Conjugation, Optical Engineering, vol. 21, p. 156 (1982).
Tomita, Phase Conjugation Using Gain Saturation of a Nd:YAG Laser, Applied Physics Letters, vol. 34, p. 463 (1979).
Yariv, Phase Conjugate Optics and Real-Time Holography, IEEE Journal of Quantum Electronics, vol. QE-14, p. 650 (1978).
Yeh et al., Doppler-Free Phase-Conjugate Reflection, Optics Letters, vol. 9, p. 41 (1984).

Primary Examiner—Léon Scott, Jr.
Attorney, Agent, or Firm—H. Fredrick Hamann; Craig O. Malin; John J. Deinken

[57] ABSTRACT

Laser energy is combined using dynamic beam splitters that can automatically accommodate changes in the laser cavity mode structure. Nonlinear optical methods and real time holography are employed to achieve phase locking among multiple lasers. A single laser output beam can be produced from a multitude of laser cavities which collectively contribute to the output power. No outside monitoring and servo mechanisms are required, since nonlinear optical processes automatically perform the functions of both monitoring and control. A coupled laser system includes two or more lasers, each laser having a resonant cavity, a laser gain medium in the resonant cavity, and a nonlinear optical element. Each nonlinear optical element is positioned in its respective resonant cavity to diffract laser energy from the cavity to a coupling beam by means of four-wave mixing (phase conjugation). Each cavity is coupled to another resonant cavity within the system by the coupling beams such that nonlinear optical interactions phase lock the outputs of all the lasers.

22 Claims, 7 Drawing Figures

PHASE COUPLING MULTIPLE LASERS

BACKGROUND OF THE INVENTION

This invention is concerned with techniques for efficiently coupling the energy output from multiple lasers.

Laser beam combining has become a subject of great interest in the field of high power lasers. Combining the power from multiple lasers is a highly desirable task for such applications as beam designation, phased array laser radars, and optical communications. The generic problem involves how to coherently combine two laser beams which have the same central frequency, but different phases. Such combining is generally very difficult because the combining system must exhibit a dynamic response to phase variations.

In phased-array lasers, beam combining imposes very stringent conditions on the relative phases of the individual lasers. None of the phased-array diode lasers made to date provide for the control of these relative phases. Rather, the laser itself selects phases so as to minimize its threshold current, and in many cases this process favors undesirable phases.

Two laser beams can, in principle, be combined using a simple beam splitter or a grating, provided that the phases of the beams can be adjusted and maintained, both spatially and temporally, at optimum values. For a variety of reasons, however, such phase adjustment and maintenance is an extremely difficult task, particularly when moderate or high power lasers are involved. Active monitoring in time of the laser phases over the entire beam profiles is necessary. This phase monitoring is used to trigger conventional servo systems to stabilize the phases for optimum coupling.

When intracavity beam splitters are used as the coupling mechanism for injection locking two or more lasers, the phase of each injected beam generally will not coincide with the phase of the correspondent resonant cavity mode over any appreciable time interval.

For these reasons, and in spite of substantial ongoing efforts, the laser beam combining problem has not been adequately solved to date.

SUMMARY OF THE INVENTION

This invention addresses the problem of how to phase-lock separate lasers such that their beams can be coherently combined. The invention has the important practical application of making it possible to combine the separate outputs of an array of low-power lasers into a single, powerful, and coherent output beam. The invention uses nonlinear optical elements inside the laser resonator cavities to phase-lock the separate laser resonator cavities. Even if the positions of the laser mirrors drift with time, the nonlinear optical elements will keep the lasers locked together. These phase-locked lasers can be combined using conventional diffractive, reflective, or refractive optics.

Laser energy is combined in this invention using dynamic beam splitters that can automatically accommodate changes in the laser cavity mode structure. Nonlinear optical methods and real time holography are employed to achieve phase locking among multiple lasers. The invention can also provide a single output beam from a multitude of laser cavities which collectively contribute to the output power. No outside monitoring and servo mechanisms are required, since nonlinear optical processes automatically perform the functions of both monitoring and control.

According to this invention, a coupled laser system includes a plurality of lasers, each laser having a resonant cavity, a laser gain medium in the resonant cavity, and a nonlinear optical element. Each nonlinear optical element is positioned within its respective resonant cavity to diffract laser energy from the cavity to a coupling beam by means of four-wave mixing (optical phase conjugation). Each cavity is coupled to another resonant cavity by one of the coupling beams such that nonlinear optical interactions phase lock all of the laser outputs.

The system may also include a diverting element, such as a beam splitter, for injecting a portion of the laser energy from one of the cavities into one of the nonlinear optical elements to initiate the four-wave mixing process.

The phase conjugating function may be provided by photorefractive crystals. In a more particular embodiment, at least one of the photorefractive crystals also functions as an end mirror of the corresponding resonant cavity for reflecting energy into that resonant cavity. The laser system may also include a photorefractive crystal which operates as an end mirror for two or more resonant cavities.

In an alternative embodiment, the four-wave mixing function and the laser gain function of each laser are both provided by a phase conjugating laser gain medium. In this embodiment, optical energy may be coupled out of each resonant cavity by the corresponding phase conjugating laser gain medium in a single output beam common to all the resonant cavities. Furthermore, a single phase conjugating laser gain medium may be used, in which case each resonant cavity extends through the laser gain medium in a different direction.

A method of coupling multiple lasers involves placing a nonlinear optical element in each resonant cavity to diffract laser energy from that cavity to a coupling beam by means of four-wave mixing or phase conjugation. The nonlinear optical elements and the resonant cavities are positioned such that each cavity is coupled to another cavity by the phase conjugate coupling beams and such that nonlinear interactions phase lock the outputs of all the lasers.

DESCRIPTION OF THE INVENTION

The main problem addressed by this invention is that separate lasers have separate frequencies, which drift as a result of perturbations, such as movement of the laser mirrors. The main phenomenon used by the invention to overcome this problem is known as four-wave mixing or optical phase conjugation. One of the outstanding features of the present invention is its use of phase conjugation to combine the energies from two or more separate laser resonant cavities into a single output. The optical couplings which occur between the resonant cavities are used to phase lock the oscillations in all of the cavities and thereby permit combining the energy from multiple lasers.

Two separate approaches, using photorefractive crystals or using nonlinearities in laser gain media, are employed in this invention to combine laser beams through nonlinear effects. The basic physics is the same in either approach—the properties of each laser resonator are modified by the dynamic holograms produced in a nonlinear medium through four-wave mixing so that the resonant beams all have the same frequency.

Figure 1:
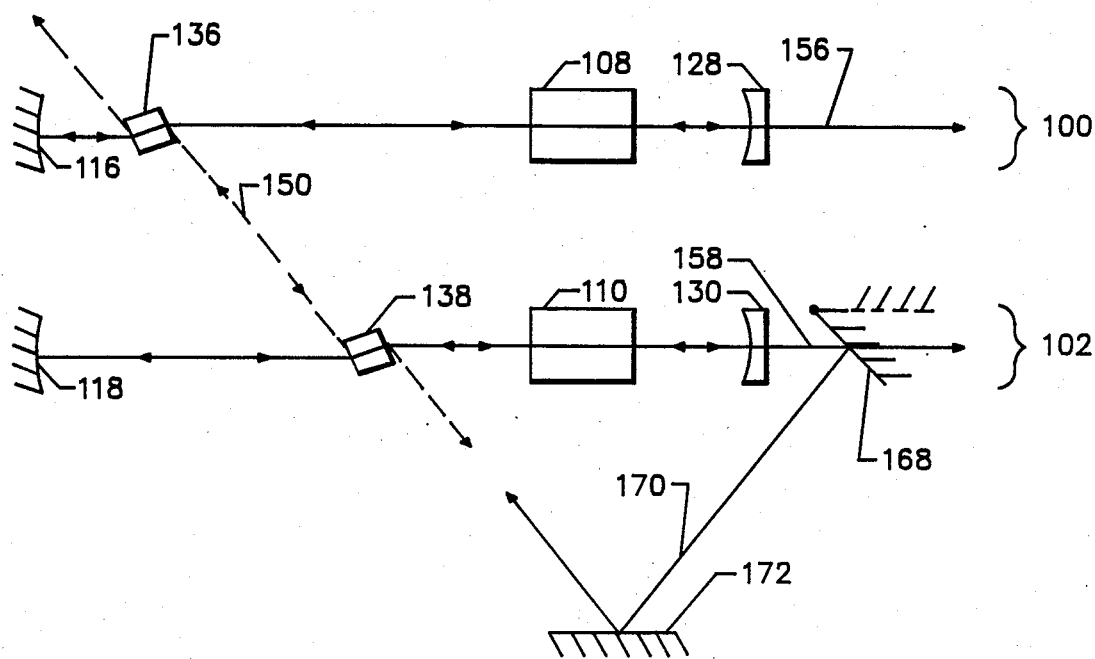
FIG. 1 is a schematic diagram of a coupled two laser system constructed according to this invention.

A first embodiment of this invention, using photorefractive crystals, is illustrated in FIG. 1, which is a schematic diagram of a coupled two laser system. This system includes a first laser 100, which consists of a gain medium 108, an end mirror 116, and an output coupler 128, and a second laser 102, having a gain medium 110, an end mirror 118, and an output coupler 130. A self-oscillating coupling beam 150 is generated automatically via self-pumped phase conjugation between a photorefractive crystal 136, which is positioned within the resonant cavity of the first laser 100, and a photorefractive crystal 138, which is within the resonant cavity of the second laser 102. The beam 150 provides coupling between the two cavities, so that the outputs 156 and 158 from this pair of lasers are phase locked; that is, the difference between the phases of the two beams is kept constant. The beams can thus be combined interferometrically into a single beam by means known to those skilled in the art.

After the lasers 100 and 102 are turned on, four-wave mixing will eventually generate the coupling beam 150 between the crystals 136 and 138 by the selective amplification of random noise in the system. There are advantages, however, to using a small injection signal from the output of one laser in the system to speed up the process, rather than relying on noise to initiate the self-oscillation. One way to do this is illustrated in the system of FIG. 1, where a beam splitter 168 may be temporarily positioned to intercept and reflect a portion 170 of the laser energy emanating from the laser 102. This energy is directed, by means of the beam splitter 168 and a mirror 172, in the direction of the phase conjugate coupling beam 150, thereby initiating the four-wave mixing process in the crystals 136 and 138. Once the coupling process has been so initiated, the beam splitter 168 may be removed from the output beam of the laser 102.

Figure 2:
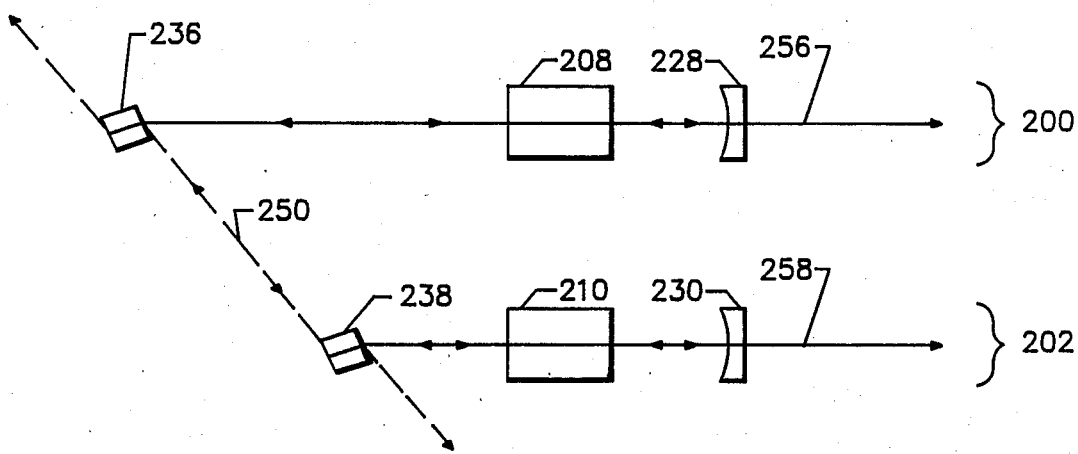
FIG. 2 is a schematic similar to that of FIG. 1, but illustrating a coupled laser system wherein the photorefractive crystals also function as the end mirrors for their respective laser cavities.

As those skilled in the art will appreciate, the photorefractive crystals can also function as the end mirrors for their respective laser cavities, as illustrated by the embodiment shown in FIG. 2. This coupling system is similar to that of FIG. 1, except that the photorefractive crystals 236 and 238 provide phase conjugate coupling between the lasers 200 and 202 by means of the coupling beam 250, as well as operating to reflect incident laser beams back into their respective cavities. Phase conjugate reflectors are known in the art, as in, e.g., Pearson, U.S. Pat. No. 4,390,991; Valley, U.S. Pat. No. 4,493,085; Jain, et al., U.S. Pat. No. 4,493,086; Feinberg, U.S. Pat. No. 4,500,855; Feinberg, Continuous-Wave Self-Pumped Phase Conjugator with Wide Field of View, Optics Letters, Volume 8, Pages 480–482 (1983); and Ewbank, et al., Time Reversal by an Interferometer with Coupled Phase-Conjugate Reflectors, Optics Letters, Volume 10, Pages 282–284 (1985). The teachings of these references are incorporated by reference.

Figure 3:
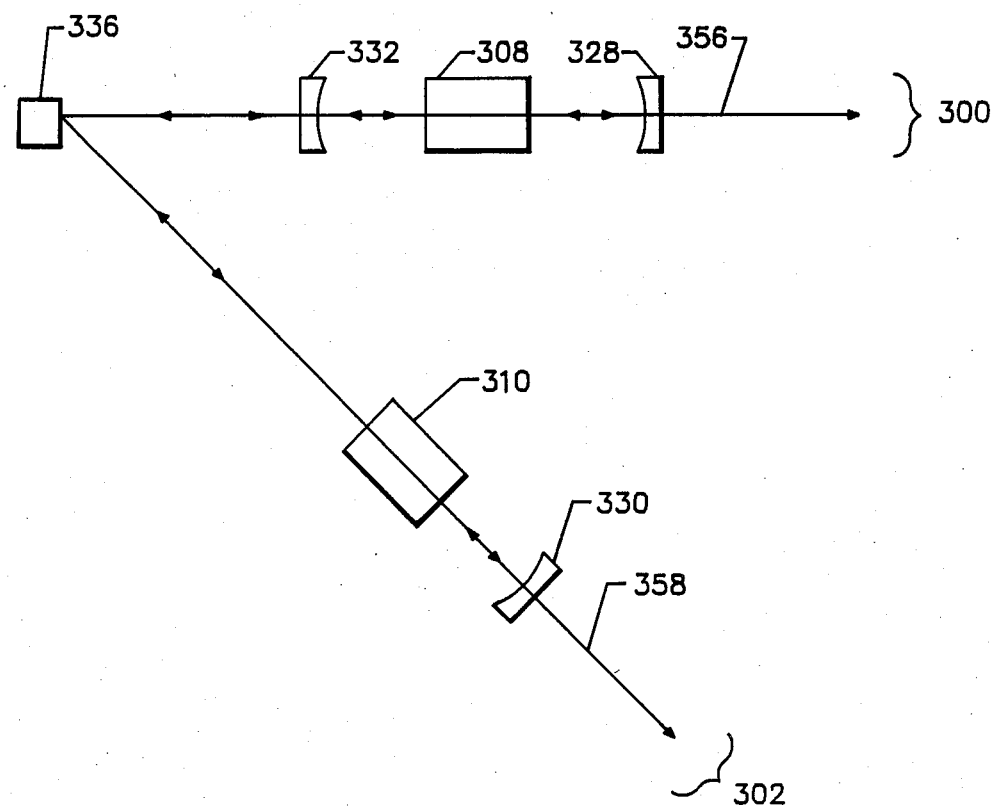
FIG. 3 is a schematic diagram of a coupled two laser system which uses a single photorefractive crystal.

The coupling technique of this invention can also be accomplished with a single photorefractive crystal, as illustrated in FIG. 3. In this embodiment, the gain media 308 and 310, and the output couplers 328 and 330, as well as an optional output coupler which can be added to the laser 300, are similar to the analogous elements of FIGS. 1 and 2. The lasers 300 and 302, however, are positioned so that a single photorefractive crystal 336 functions as an end mirror for each of the laser cavities (or, if the optional coupler 332 is used, for the laser 302) and provides phase conjugate coupling between the lasers as well.

Figure 4:
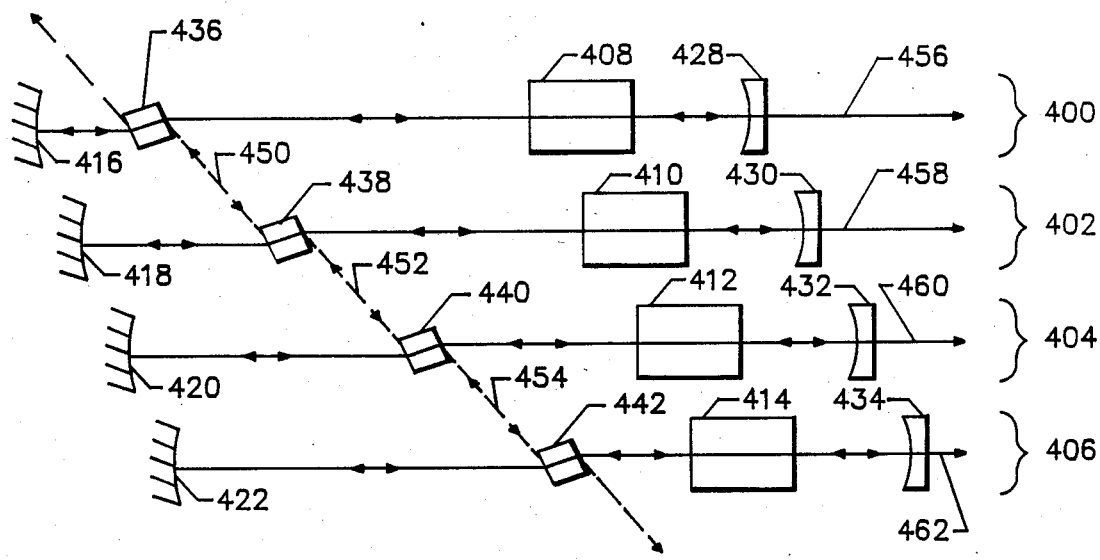
FIG. 4 is a schematic of a laser system in which four lasers are coherently coupled.

The concept of coupling two laser cavities can be further extended to three or more cavities, as shown, for example, in FIG. 4. The coupled laser system of FIG. 4 is similar to that of FIG. 1, but further includes additional lasers 404 and 406, such that the photorefractive crystal 436 is coupled to the crystal 438, which is coupled in turn to the crystal 440, etc., so that all four laser cavities are coupled.

For low to medium power levels, photorefractive crystals such as $Sr_{1-x}Ba_xNb_2O_6$ (SBN), $BaTiO_3$, and $Bi_{12}SiO_{20}$ (BSO) are adequate for beam combining. The power levels in high power lasers, however, are too great to be withstood by these kinds of solid materials. Optical four-wave mixing in nonlinear optical media which have an intrinsic third-order susceptibility can also couple the beams, with the coupling efficiency increasing as the power increases. Such a process is suitable for high power lasers. To utilize the nonlinear power dependence, it is desirable to have the four-wave mixing occur inside the laser resonator cavity, where the optical intensity is larger than it is outside the laser. Laser gain media are particularly suitable, since at the laser frequency the nonlinear susceptibility is large and the laser gain more than compensates for the absorption effects.

Figure 5:
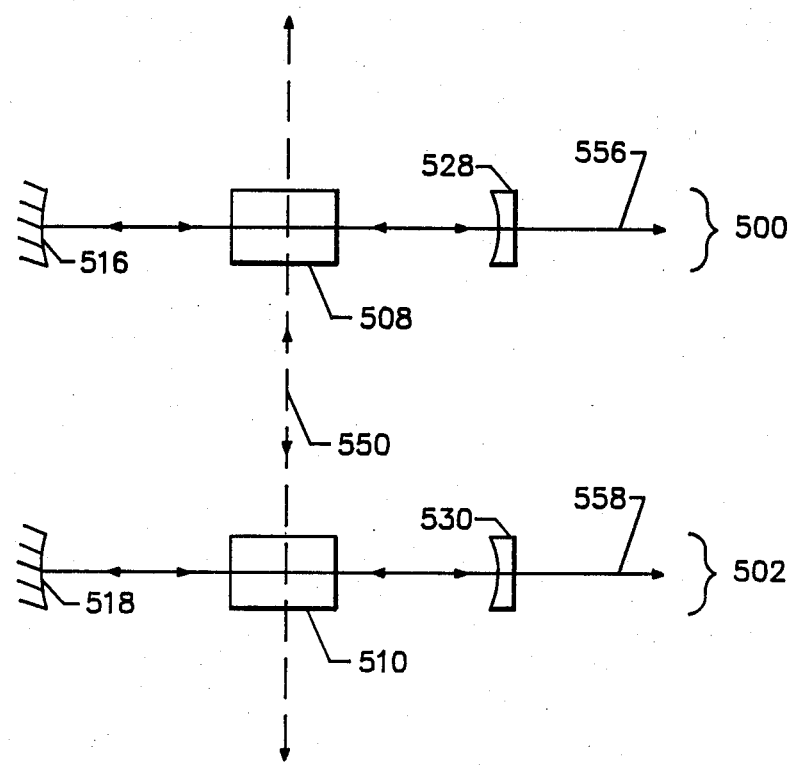
FIG. 5 is a schematic of a coupled laser system in which the laser gain media are also used for phase locking the laser cavities.

An embodiment of the invention which uses the laser gain media itself for phase locking the laser cavities is schematically depicted in FIG. 5. In this device, a first laser 500 consists of an end mirror 516, an output coupler 528, and a phase conjugating laser gain medium 508. A similar second laser 502 includes an end mirror 518, an output coupler 530, and a phase conjugating laser gain medium 510. The laser gain media 508 and 510 replace the photorefractive crystals used as the nonlinear optical media in the previous embodiments. Here, the four wave mixing which occurs in each laser gain medium generates the necessary coupling beam 550 between the two laser cavities. In this embodiment, a double phase conjugate resonant cavity is established, (see Ewbank, et al., supra). As in the other embodiments of this invention, it may be desirable to provide an injected beam to help initiate the four-wave mixing process, as was illustrated and discussed with respect to FIG. 1. Due to the self oscillation between the two laser cavities, phase locking should occur. If the two lasers are phase locked, then their outputs 556 and 558 can be combined without loss into a single beam using a simple beam splitter.

By their very nature, photorefractive materials exhibit an extrinsic optical absorption which precludes their use in any high energy laser application. If, however, the laser gain media (with their intrinsic third-order susceptibility) are utilized as the nonlinear optical elements in a double-phase-conjugate coupling resonator, the coupling performance of the system should actually improve at higher laser energies. Furthermore, efficient photorefractive materials are notoriously slow in responding to any temporal fluctuations, which might cause the coupled laser cavities to lose phase lock. In contrast, media with intrinsic third-order susceptibilities are generally many orders of magnitude faster in their response and therefore are much more likely to maintain phase locked coupling. Finally, using the laser gain media as the phase conjugate elements does not require any additional optical elements to be added in the laser cavities. The only modification needed is the provision of a direct optical path between the laser cavities which are to be coupled. The arrangement depicted in FIG. 5 can readily be generalized to incorporate more than two laser cavities, in a manner similar to that of the previous embodiments.

Figure 6:
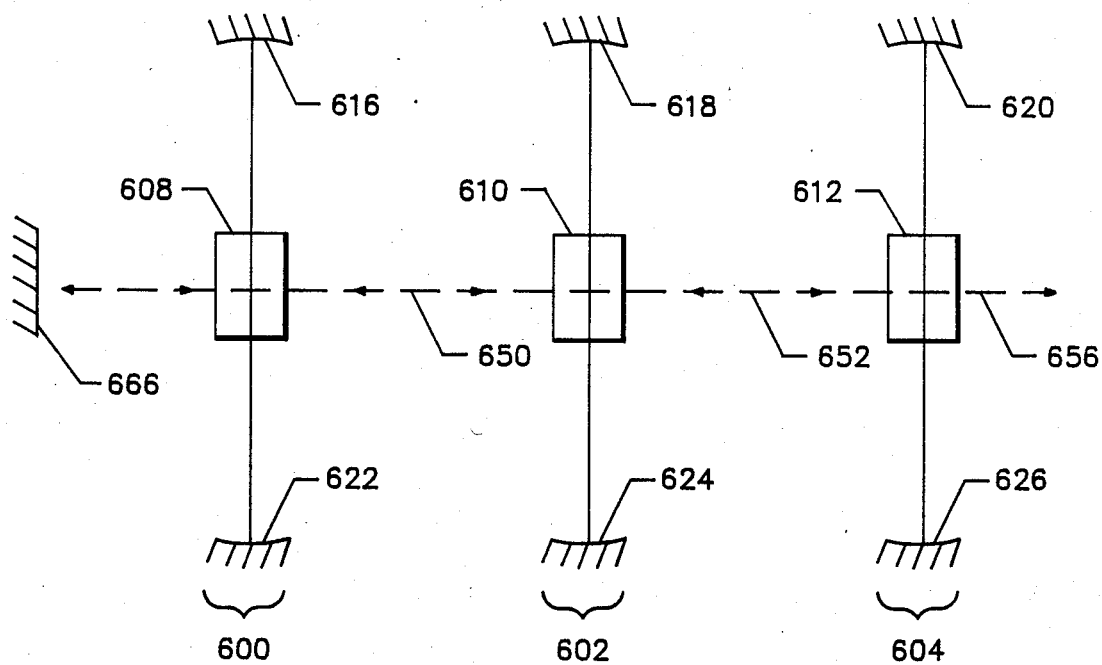
FIG. 6 depicts a coupled system utilizing a linear array of resonators, with the laser energy coupled out of the multiple resonators in a single output beam through nonlinear interactions.

FIG. 6 depicts an embodiment of the invention utilizing a linear array of resonators, each containing a gain medium (gas, liquid, or solid) suitable for four-wave mixing. In this embodiment, like that of FIG. 5, the laser gain media also accomplish four-wave mixing for the system. A first laser 600 includes laser cavity end mirrors 616 and 622, and a laser gain medium 608. A second laser 602 consists of end mirrors 618 and 624 and a laser gain medium 610, while a third laser 604 includes end mirrors 620 and 626 and a laser gain medium 612. In this configuration, each laser cavity is defined by a high reflectivity dielectric mirror at each end. Rather than extracting output energy through one end of each cavity, as in the previous embodiments, laser energy is coupled out, by means of nonlinear interactions, in the direction of the energy output beam 656. A feedback mirror 666 further defines the oscillation direction and limits the output from the lasers to a single output direction. In the absence of the mirror 666, output energy would leave the lasers in the form of two counterpropagating beams which would be spontaneously generated by the four wave mixing process in the laser media. The principles behind this beam combining technique are twofold. First, the four-wave mixing processes that occur in each laser gain medium serve to extract energy from that resonant cavity in the direction determined by the output coupler (feedback mirror 666); i.e., there is only one output beam. Second, the four-wave mixing process locks the phases of the oscillations in the various resonators.

Figure 7:
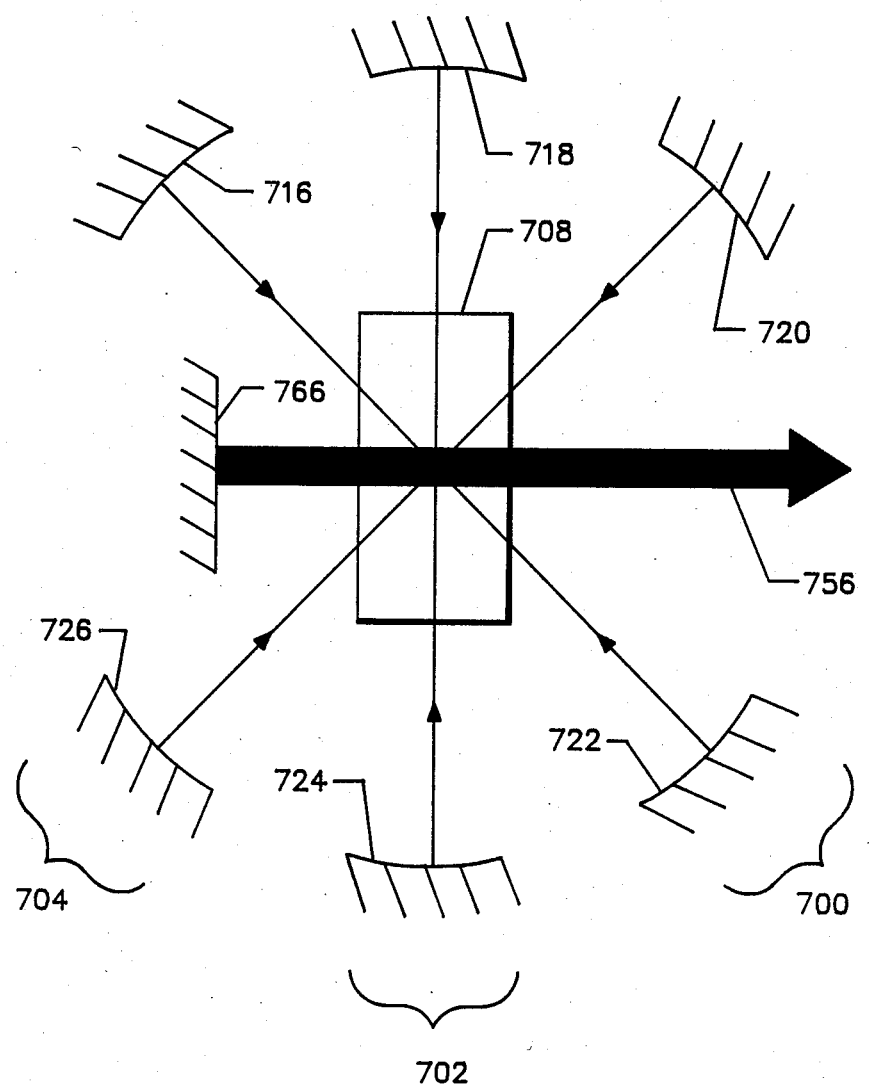
FIG. 7 is a schematic of a system similar to that of FIG. 6, but in which a single laser gain medium is shared by multiple resonant cavities.

FIG. 7 illustrates another configuration for the invention which may exhibit a larger coupling efficiency because of the high field density which is involved. Here a single laser gain medium 708 is shared by three lasers 700, 702, and 704. The resonant cavity for the first laser is defined by the end mirrors 716 and 722, the resonant cavity for the second laser is defined by the end mirrors 718 and 724, and the resonant cavity for the third laser is defined by the end mirrors 720 and 726. This embodiment of the invention utilizes a single laser gain medium 708, which is common to and is shared by all of the laser resonators, for all nonlinear interactions. The laser resonators are coupled via the four-wave mixing mechanism with or without oscillation along the direction of the output beam 756, which is defined by a feedback mirror 766. Such nonlinear optical coupling can provide phase locking between the resonators. Moreover, the planar configuration depicted in FIG. 7 can be further extended, as will be appreciated by those skilled in the art, to three dimensional structures where it is possible to add more laser resonators to the system.

The physics of the nonlinear processes which are utilized in this invention for laser beam combining has been extensively studied in connection with four wave mixing and phase conjugation in resonant media. This experience indicates that the four wave mixing operations which are crucial to the invention will occur whether or not the laser media have reached population inversion. Moreover, any gain which is achieved in the inverted laser media will contribute to substantially increased phase conjugate reflectivities and more efficient coupling among the lasers. Efficient four wave mixing in active laser media has been demonstrated in $CO_2$ at a wavelength of 10.6 microns, in Nd:YAG at a wavelength of 1.06 microns, and in dye laser media.

The preferred embodiments of the invention have been illustrated and discussed above. Modifications and additional embodiments, however, will undoubtedly be apparent to those skilled in the art. Furthermore, the dimensions of the interaction regions and the specific angles which must be arranged for the direction of beam extraction with respect to the axes of the multiple resonators must in practice be determined separately for each different laser system. The nonlinear coupling process of this invention, however, will be a common feature for all such laser systems. In addition, equivalent elements may be substituted for those illustrated and described, parts or connections might be reversed or otherwise interchanged, and certain features of the invention may be utilized independently of other features. Consequently, the examples presented herein are not all inclusive, but are intended to teach those skilled in the art how to make and use the invention to advantage, while the appended claims are more indicative of the full scope of the invention.

We claim:

1. A coupled laser system, comprising a plurality of lasers, each laser including:
   a resonant cavity,
   a laser gain medium in the resonant cavity, and
   a nonlinear optical element positioned in the resonant cavity to diffract laser energy from the cavity to a coupling beam by means of four-wave mixing;
   each cavity being coupled to another resonant cavity within the system by the coupling beams such that nonlinear optical interactions phase lock the outputs of all the lasers.

2. The laser system of claim 1, further comprising a diverting element for injecting a portion of the laser energy from one of the cavities into at least one of the nonlinear optical elements to initiate the four-wave mixing process.

3. The laser system of claim 1, wherein each nonlinear optical element further comprises a photorefractive crystal.

4. The laser system of claim 3, wherein at least one of the photorefractive crystals further comprises an end mirror of the corresponding resonant cavity for reflecting energy into that resonant cavity.

5. The laser system of claim 4, wherein at least one of the photorefractive crystals further comprises an end mirror for a plurality of resonant cavities in the system.

6. The laser system of claim 1, wherein the nonlinear optical element and the laser gain medium of each laser further comprise a phase conjugating laser gain medium.

7. The laser system of claim 6, wherein optical energy is coupled out of each resonant cavity by the corresponding phase conjugating laser gain medium in a single output beam common to all of the resonant cavities.

8. The laser system of claim 7, wherein all of the phase conjugating laser gain media further comprise a single phase conjugating laser gain medium, such that each resonant cavity extends through the laser gain medium in a different direction.

9. A coupled laser system, comprising a plurality of lasers each laser including:
a resonant cavity,
a laser gain medium in the resonant cavity, and
a photorefractive crystal positioned in the resonant cavity to diffract laser energy from the cavity to a coupling beam by means of four-wave mixing;
each cavity being coupled to another resonant cavity within the system by the coupling beams such that nonlinear optical interactions phase lock the outputs of all the lasers.

10. The laser system of claim 9, further comprising a diverting element for injecting a portion of the laser energy from one of the cavities into at least one of the photorefractive crystals to initiate the four-wave mixing process.

11. The laser system of claim 9, wherein at least one of the photorefractive crystals further comprises an end mirror of the corresponding resonant cavity for reflecting energy into that resonant cavity.

12. The laser system of claim 11, wherein at least one of the photorefractive crystals further comprises an end mirror for a plurality of resonant cavities in the system.

13. A coupled laser system, comprising a plurality of lasers, each laser including:
a resonant cavity, and
a phase conjugating laser gain medium positioned in the resonant cavity to diffract laser energy from the cavity to a coupling beam by means of four-wave mixing;
each cavity being coupled to another resonant cavity within the system by the coupling beam such that nonlinear optical interactions phase lock the outputs of all the lasers.

14. The laser system of claim 13, further comprising a diverting element for injecting a portion of the laser energy from one of the cavities into at least one of the phase conjugating laser gain media to initiate the four-wave mixing process.

15. The laser system of claim 13, wherein the coupling beam further comprises a single output beam by which optical energy is coupled out of each resonant cavity by the corresponding phase conjugating laser gain medium.

16. A method of coupling a plurality of lasers, each laser including a resonant cavity and a laser gain medium in the resonant cavity, comprising the steps of:
placing a nonlinear optical element in each resonant cavity to diffract laser energy from that cavity to a coupling beam by means of four-wave mixing and
positioning the nonlinear optical elements and the resonant cavities such that each cavity is coupled to another cavity by the coupling beams and such that nonlinear interactions phase lock the outputs of all the lasers.

17. The method of claim 16, further comprising the step of injecting a portion of the laser energy from one of the cavities into at least one of the nonlinear optical elements to initiate the four-wave mixing process.

18. The method of claim 16, wherein each nonlinear optical element further comprises a photorefractive crystal.

19. The method of claim 18, wherein the step of placing a nonlinear optical element further comprises placing at least one of the photorefractive crystals to operate as an end mirror of the corresponding resonant cavity and reflect energy into that resonant cavity.

20. The method of claim 19, wherein the step of placing a nonlinear optical element further comprises placing at least one of the photorefractive crystals to operate as an end mirror for a plurality of the resonant cavities.

21. A method of coupling a plurality of lasers, each laser including a resonant cavity and a phase conjugating laser gain medium in the resonant cavity, comprising the steps of:
positioning each phase conjugating medium and each resonant cavity such that laser energy is diffracted from the corresponding cavity to a coupling beam by means of four-wave mixing, such that each cavity is coupled to another cavity by the coupling beams, and such that nonlinear interactions phase lock the outputs of all the lasers.

22. The method of claim 21, wherein the step of positioning each phase conjugating medium and each resonant cavity further comprises positioning each phase conjugating medium and each resonant cavity such that optical energy is coupled out of each resonant cavity by the corresponding phase conjugating laser gain medium in a single output beam common to all of the resonant cavities.

* * * * *